(12) United States Patent
Dunn

(10) Patent No.: US 6,714,348 B2
(45) Date of Patent: Mar. 30, 2004

(54) CORDLESS MICROSCOPE

(75) Inventor: Thomas M. Dunn, Leawood, KS (US)

(73) Assignee: Ken-A-Vision Manufacturing Co., Inc., Kansas City, MO (US)

( * ) Notice: Subject to any disclaimer, the term of this patent is extended or adjusted under 35 U.S.C. 154(b) by 80 days.

(21) Appl. No.: 10/004,339

(22) Filed: Nov. 14, 2001

(65) Prior Publication Data

US 2003/0090791 A1 May 15, 2003

(51) Int. Cl.$^7$ .................. G02B 21/06; G02B 21/00
(52) U.S. Cl. .................. 359/387; 359/368; 359/385; 359/390
(58) Field of Search .................. 359/368–390; 362/237–243, 20, 149, 575

(56) References Cited

U.S. PATENT DOCUMENTS

| | | | | |
|---|---|---|---|---|
| 3,971,622 A | * | 7/1976 | Yoshinaga | 359/390 |
| 4,157,007 A | * | 6/1979 | Vennard | 368/83 |
| 4,852,985 A | * | 8/1989 | Fujihara et al. | 359/387 |
| 5,408,084 A | * | 4/1995 | Brandorff et al. | 250/208.1 |
| 5,539,623 A | * | 7/1996 | Gurz et al. | 362/20 |
| 5,642,933 A | * | 7/1997 | Hitora | 362/243 |
| 5,970,167 A | * | 10/1999 | Colvin | 382/149 |
| 6,152,590 A | * | 11/2000 | Furst et al. | 362/545 |
| 6,313,943 B1 | * | 11/2001 | Ikado et al. | 359/368 |
| 6,488,398 B1 | * | 12/2002 | Bloch et al. | 362/575 |
| 6,502,956 B1 | * | 1/2003 | Wu | 362/237 |

FOREIGN PATENT DOCUMENTS

| | | | | |
|---|---|---|---|---|
| CA | 2262912 | * | 8/2000 | 359/390 |
| JP | 1-170913 | * | 7/1989 | 359/385 |
| JP | 2003-58084 | * | 2/2003 | 362/346 |
| WO | WO 00/70687 | * | 11/2000 | 362/246 |

* cited by examiner

Primary Examiner—Thong Q. Nguyen
(74) Attorney, Agent, or Firm—Hovey Williams LLP

(57) ABSTRACT

A microscope (10) having an improved light source assembly (40) that provides sufficient illumination for sophisticated microscopic applications while requiring so little power that it may be operated with a small, rechargeable battery pack (46) that provides over 40 hours of continuous operation from a single charge. The light source assembly (40) has a bulb life of approximately 100,000 hours and operates at temperatures significantly below the operating temperatures of conventional microscope bulbs.

15 Claims, 4 Drawing Sheets

CORDLESS MICROSCOPE

BACKGROUND OF THE INVENTION

1. Field of the Invention

The present invention relates to microscopes and related instruments. More particularly, the invention relates to a cordless microscope with an improved light source assembly.

2. Description of the Prior Art

Microscopes are commonly used in laboratories, classrooms, and other applications and are considered to be among the most valuable scientific instruments ever invented. To permit magnified viewing of a specimen, a typical microscope requires that the specimen be illuminated. Microscopes are arranged either for transmitted illumination, where light is passed through the specimen, or for reflected illumination, where light bounces back from the specimen. Transmitted lighting is more usual today.

Ambient or general purpose room lighting is typically not intense enough to provide the desired amount of specimen illumination; therefore, most microscopes include an electric lamp or other means of artificial illumination. Typically, the lamp is built into the base or stand of the microscope and is plugged into a conventional 120 volt AC outlet with an electrical cord. Unfortunately, such electrical cords cause several problems. For example, many laboratories and classrooms do not have an adequate number of available AC outlets in which to plug the cords. This necessitates the use of unsightly and bulky extension cords and multiple-outlet plug-in strips. Another problem is that researchers, students, and teachers often wish to move their microscopes from location to location, requiring the cords to be frequently unplugged and then replugged into new outlets. Microscopes with electrical cords also cannot be used outdoors and other locations where no AC electrical outlets are available.

Cordless microscopes have been developed to address some of the above-identified concerns. Unfortunately, however, currently-available cordless microscopes suffer from several distinct disadvantages. For example, because sophisticated microscopes use relatively high-wattage bulbs to provide adequate specimen illumination, a quality cordless microscope either requires a large battery to power the bulb or has a very short operating life between battery charges. Some cordless microscopes solve this problem by using lower wattage bulbs. While these types of microscopes are adequate for use as toys, they do not provide adequate illumination for most scientific and educational applications.

Another limitation of existing cordless microscopes, and all microscopes in general, is that they typically use tungsten, halogen, or fluorescent bulbs that generate a great deal of excess heat. Such heat may cause burns and may undesirably raise the temperature of any specimens placed in the vicinity thereof. The excess heat may be dissipated by fans, but this further increases the power requirements, cost, and complexity of the microscopes.

Another limitation of existing cordless microscopes, and all microscopes in general, is that their bulbs frequently burn out and/or break and therefore must be replaced. This necessitates a partial dismantling of a microscope's base or stand to access, remove, and replace its bulb.

SUMMARY OF THE INVENTION

The present invention solves the above-described problems and provides a distinct advance in the art of cordless microscopes and microscopes in general. More particularly, the present invention provides a microscope having an improved light source assembly that provides sufficient illumination for sophisticated microscopic applications while requiring so little power that it may be operated with a small, rechargeable battery pack that provides over 40 hours of continuous operation from a single charge. The light source assembly has a bulb life of approximately 100,000 hours and operates at temperatures significantly below the operating temperatures of conventional microscope bulbs.

One embodiment of the light source assembly of the present invention broadly includes a circuit board, a plurality of Light Emitting Diodes (LEDs) mounted on the circuit board, and a connector configured for coupling with a rechargeable battery. The circuit board is preferably circular in shape and is coated with a reflective material to reflect light emitted from the LEDs. The circuit board fits within a circular opening in the base of a microscope and replaces a conventional microscope lamp.

The LEDs have a highly-focused angle of illumination, operate at a high candle power, and generate optimum true white light to provide an illumination approximately equal to that of a conventional 20-watt bulb. Advantageously, the LEDs require much less power than conventional microscope bulbs and operate at a much lower temperature. The light source assembly of the present invention therefore needs no cooling fan and can be powered by a small battery pack that provides for approximately 40 hours of continuous operation from a single charge. The LEDs have a bulb life of approximately 100,000 hours and therefore may never need to be replaced. In the event that the LEDs require replacement, the entire light source assembly can be easily removed from the microscope and replaced with another similar or identical light source assembly.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
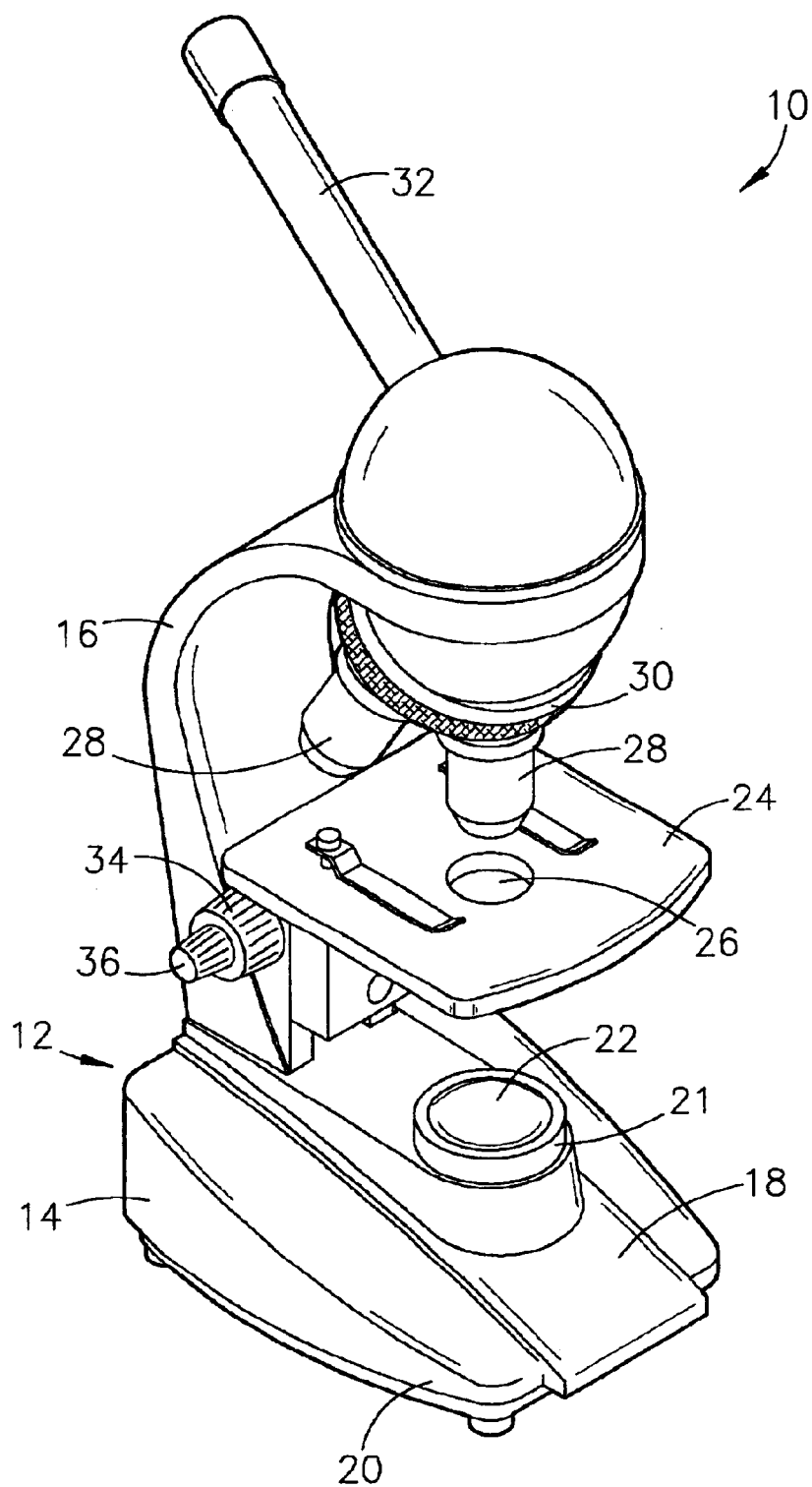
FIG. 1 is an isometric view broadly depicting a cordless microscope in which the principles of the present invention may be implemented.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 2:
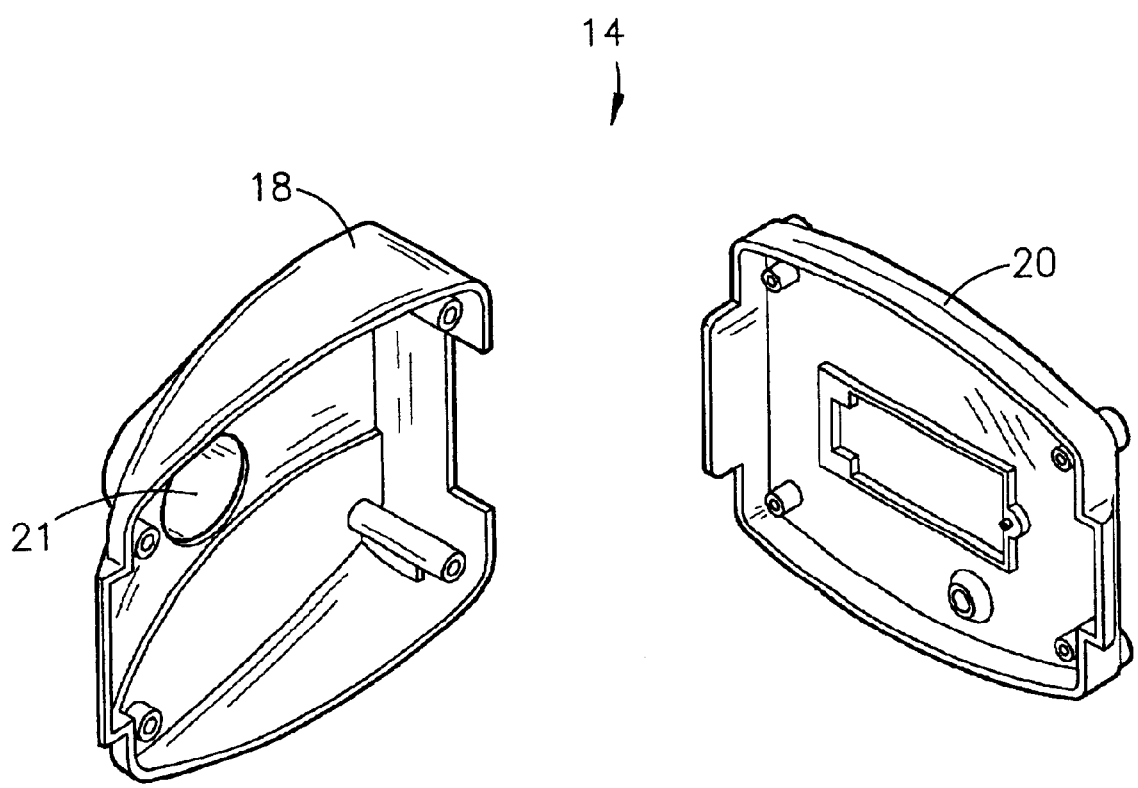
FIG. 2 is an exploded isometric view of the base of the microscope of FIG. 1.

Turning now to the drawing figures, and particularly FIG. 1, a cordless microscope 10 constructed in accordance with a preferred embodiment of the invention is illustrated. The cordless microscope 10 has many of the same components as conventional plug-in microscopes such as the T-1201 and T-1901 model microscopes manufactured and sold by Ken-A-Vision Manufacturing Co., Inc., of Kansas City, Mo. For example, the cordless microscope 10 preferably includes a conventional stand 12 having a base 14 which may be placed on a counter top or other level surface and an upstanding arm 16 supported on the base 14. As illustrated in FIG. 2, the base 14 includes an upper section 18 and a lower section 20 that can be removably connected with screws or other conventional fasteners. The upper section 18 has a raised circular lamp holder 21 for receiving a light source as described below. The top of the lamp holder 21 defines a circular opening 22 for directing light out of the base 14 as described in more detail below.

Returning to FIG. 1, the microscope 10 also includes a stage 24 supported by the arm 16 for holding specimens to be viewed. The stage 24 includes an opening 26 in approximate axial alignment with the circular opening 22 in the base 14. As is conventional, specimens are placed on the stage 24 over the opening 26 so that light may pass through the specimens. The microscope 10 also includes one or more objective lenses 28 supported by the arm 16 above the stage 24 for magnifying images of specimens placed on the stage 24. The objective lenses 28 may be mounted on a rotatable head 30 or carousel that allows certain ones of the lenses 28 to be selected for use.

The microscope 10 also includes one or more eyepiece lenses 32 mounted on the arm 16 above the objective lenses 28 for providing further magnification of specimen images and for permitting a user to view the images. The eyepiece lenses 32 may also be mounted to a rotating head or carousel. The cordless microscope 10 also includes conventional controls mounted to the stand 12 such as coarse and fine coaxial focusing knobs 34, 36.

Figure 3:
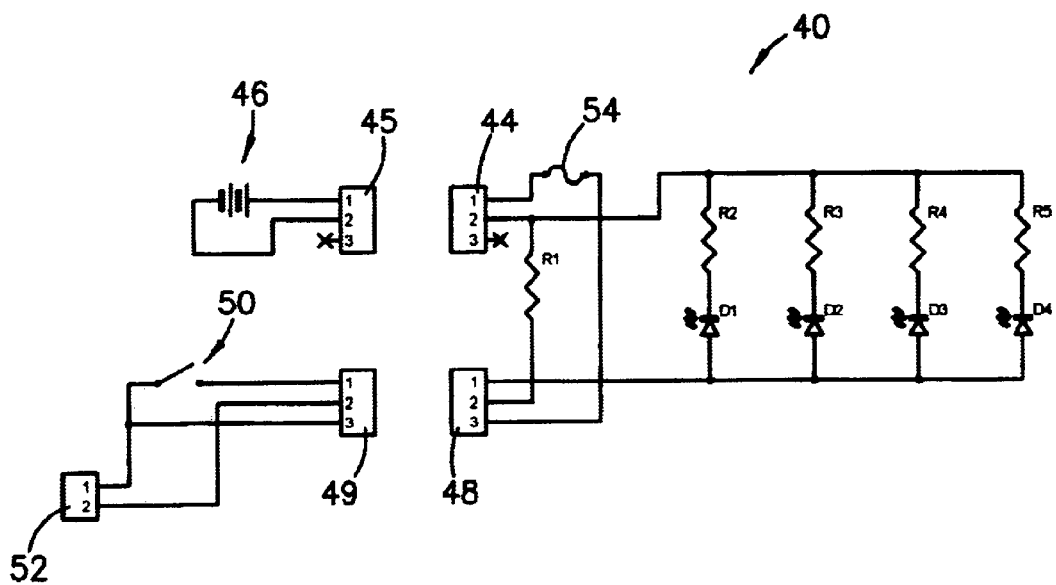
FIG. 3 is an electrical circuit diagram depicting certain components of the light source assembly of the cordless microscope.
Figure 4:
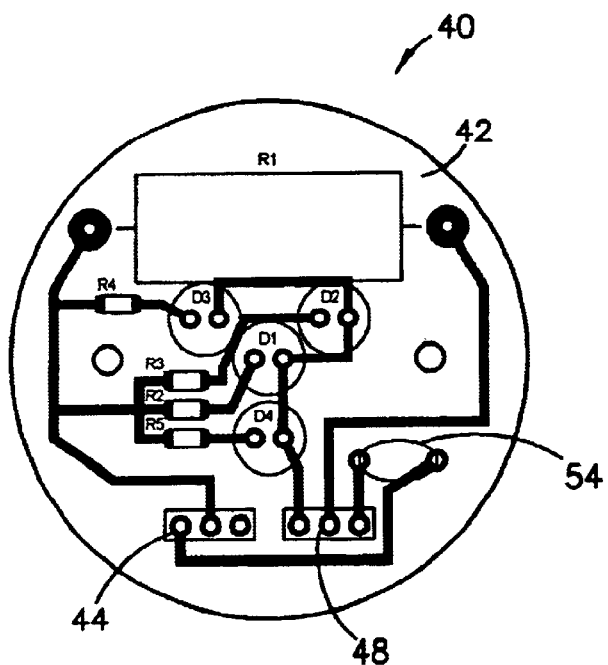
FIG. 4 is a top plan view of the light source assembly.

In accordance with one important aspect of the present invention, the microscope 10 also includes an improved light source assembly 40 illustrated in FIGS. 3 and 4 that replaces or is used instead of a conventional fluorescent, halogen, or tungsten light bulb. The preferred light source assembly 40 broadly includes a circuit board 42, a plurality of LEDs D1, D2, D3, and D4 mounted on the circuit board 42, a first connector 44 configured for connecting to a battery or battery pack 46, a second connector 48 configured for connecting to an on/off switch 50, and a third connector 52 configured for connecting to a battery recharger.

Figure 5:
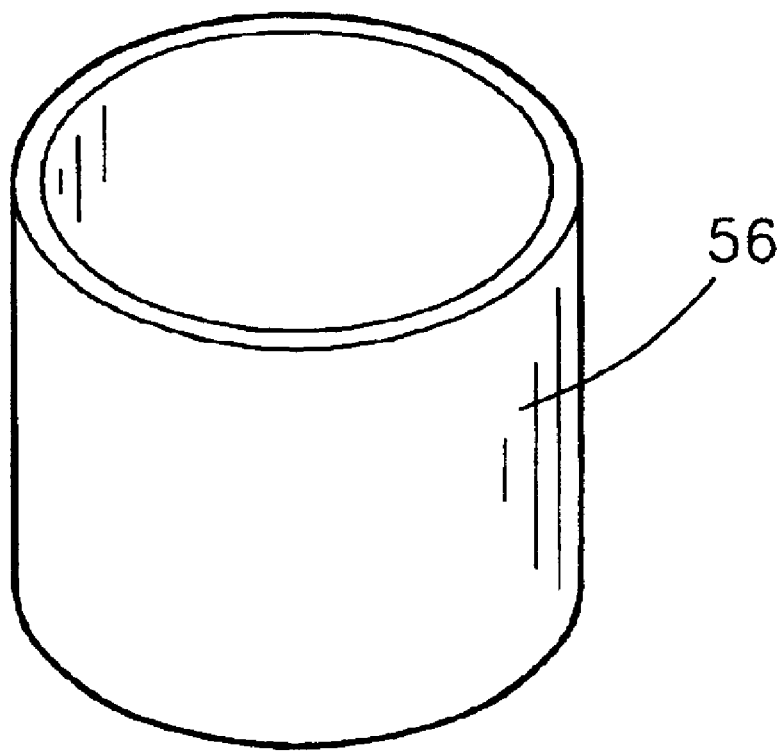
FIG. 5 is an isometric view of reflective tube that may be used in certain embodiments of the cordless microscope.

The circuit board 42 is preferably a conventional printed circuit board that is cut or formed so that it fits snugly within the lamp holder 21 formed in the microscope base 14. The top surface of the circuit board 42 is preferably coated with a highly reflective material such as tin to reflect light emitted from the LEDs upwardly toward a sample placed over the opening 26 in the stage 24. For microscopes having a raised or elongated lamp holder, the circuit board 42 may be placed in an internally-reflective tube 56 illustrated in FIG. 5 which is then in turn placed in the raised lamp holder. Light emitted from the circuit board 42 is then reflected upwardly and off of the interior walls of the tube 56 and out through the opening of the lamp holder. A 28 mm white frosted filter is preferably positioned in the top of the lamp holder 21 to filter the light emitted from the LEDs toward the stage 24.

As best illustrated in FIG. 4, the LEDs D1, D2, D3, and D4 are arranged on the top surface of the circuit board 42 so as to project light upwardly toward a sample placed on the stage 24. In preferred forms, the light source assembly 40 includes four LEDs positioned in the approximate center of the circuit board 42 and arranged in a substantially Y-shaped configuration.

The LEDs have special operating characteristics that enhance and optimize the light output of the light source assembly 40. For example, the LEDs have a highly-focused angle of illumination so that most of their generated light is projected upwardly toward the stage 24, rather than sideways or down toward the circuit board 42. It has been determined that the optimum angle of illumination is approximately 20 degrees. In contrast, conventional LEDs have a much less focused angle of illumination in the range of 80–180 degrees. Moreover, the LEDs emit a true white light, rather than a blue light as is conventional with LEDs, that provides superior sample illumination for microscopic applications. Further, each LED provides over 5,000 millicandellas (MCD) of illumination, but operates at a temperature less than 25 degrees C. Finally, each LED has a bulb life of approximately 100,000 hours. The preferred LEDs are supercool-white InGaN discrete model number L200CWGKB-22D LEDs manufactured by Ledtronics.

Because the LEDs are arranged on a reflective coated circuit board 42, have a highly-focused angle of illumination, operate at a high candle power, and generate optimum true white light, the light source assembly 40 provides illumination equivalent to a 20-watt bulb. Advantageously, however, the light source assembly 40 requires much less power than a conventional 20-watt bulb and operates at a much lower temperature. The light source assembly 40 therefore needs no cooling fan and can be powered by a small battery pack 46 as described below.

The first connector 44 is preferably mounted on the circuit board 42 and is electrically connected with the LEDs so that it may be connected with the battery pack 46 for powering the LEDs. The connector 44 is preferably a three-pin, female-type jack terminal configured for coupling with a corresponding male-type pin connector 45 wired to the battery pack 46. The preferred battery pack 46 is a four-battery Nickel Metal Hydride (NiMH) 4.8 volt 1500 mAH battery pack. Such a battery pack 46 is small enough to fit within the upper 18 and lower 20 sections of the microscope base 14, yet is powerful enough to power the LEDs for forty hours of continuous illumination on a single charge. The battery pack 46 may be recharged with a conventional charger in approximately eight hours and has a life of approximately 500 recharging cycles.

The second connector 48 is also preferably mounted on the circuit board 42 and is configured for connecting to the on/off switch 50 to switch the LEDs on and off. The on/off switch 50 is preferably mounted on the outside of the microscope stand 12 but may be mounted elsewhere as a matter of design choice. The second connector 48 is preferably a female-type, three-pin jack terminal configured for coupling with a corresponding male-type pin connector 49 wired to the on/off switch 50.

The third connector 52 is preferably mounted flush with the outside of the microscope stand 12 and is configured for coupling with a battery charger. The third connector 52 is preferably a two-pin, female-type jack terminal wired to the pin connector 49. The preferred charger is a 9-volt DC, 300 mA charger such as the Calrad Model No. VFBT-757 charger.

As illustrated in FIGS. 3 and 4, the LEDs are wired in parallel between the first pin of the second connector 48 and the second pin of the first connector 44. Each LED is also preferably connected in series with a 68 ohm, 5 watt resistor R2, R3, R4, R5 for limiting the current flow therethrough. A 60 volt, .5 amp fuse 54 is preferably wired between the first pin of the first connector 44 and the third pin of the second connector 48. A 68 ohm, 5 watt resistor R1 is connected between the second pin of the first connector 44 and the second pin of the second connector 48 to regulate current delivery from the battery charger to the battery pack 46. The connections between the various components on the circuit board are preferably printed directly on the circuit board with conductive foil material.

To operate the light source assembly 40 and thus the microscope 10, the first connector 44 is coupled with the pin connector 45 connected to the battery pack 46 and the second connector 58 is connected to the pin connector 49 connected to the on/off switch 50. The on/off switch 50 may then be closed to switch power from the battery pack 46 to the LEDS so as to illuminate the LEDs. Light emitted from the LEDs is then directed upwardly through the circular opening 22 in the upper section 18 of the base 14 toward the stage 24 so as to illuminate any samples placed thereon. As discussed above, any light that is not initially directed upwardly from the LEDs reflects off of the reflective circuit board 42, and in some embodiments the internally-reflective tube 56, toward the stage 24. The on/off switch 50 may be opened at any time to disconnect the battery pack 46 from the LEDs.

When the battery pack 46 becomes discharged, a battery charger may be plugged into the third connector 52. This automatically disconnects the LEDs from the battery pack 46 and begins charging the battery pack 46.

If any of the LEDs burn out, the entire light source assembly 40 can be easily removed and replaced with a new light source assembly by dismantling the microscope base 14 and disconnecting the first connector 44 from the pin connector 45 and the second connector 48 from the pin connector 49. Because the LEDs and all other circuitry are mounted to the circuit board 42, no further modifications are required to replace the light source assembly 40.

Although the invention has been described with reference to the preferred embodiment illustrated in the attached drawing figures, it is noted that equivalents may be employed and substitutions made herein without departing from the scope of the invention as recited in the claims. For example, although the light source assembly of the present invention is especially suited for use with a cordless microscope, it may also be used with conventional microscopes that plug into a 120-volt AC power source. An analog to digital converter and other circuitry would be required for such an application.

Having thus described the preferred embodiment of the invention, what is claimed as new and desired to be protected by Letters Patent includes the following:

What is claimed is:

1. A cordless microscope comprising:
   a stand;
   a stage-supported by the stand for holding specimens to be viewed;
   an objective lens supported by the stand for magnifying an image of a specimen on the stage;
   an eyepiece lens supported by the stand and coupled with the objective lens for further magnifying the image of the specimen and for permitting a user to view the image; and
   a light source assembly for illuminating the stage, the light source assembly including —
      a circuit board, and
      a plurality of LEDs mounted on the circuit board for, projecting light toward the stage, wherein the LEDs are arranged on the circuit board in a general Y-shaped configuration.

2. The cordless microscope as set forth in claim 1, the light source assembly further including a first connector mounted on the circuit board, electrically connected with the LEDs, and configured for connecting to a battery for powering the LEDs.

3. The cordless microscope as set forth in claim 2, the light source assembly further including a second connector mounted on the circuit board and configured for connecting to a switch so as to electrically connect the switch between the battery and the LEDs for switching the LEDs between on and off states.

4. The cordless microscope as set forth in claim 3, the stand including a base in which the light source assembly is mounted and an upstanding arm on which the stage, the objective lens, and the eyepiece lens are supported.

5. The cordless microscope as set forth in claim 4, wherein the circuit board is circular in shape and configured for fitting within a circular opening in the base.

6. The cordless microscope as set forth in claim 3, the light source assembly further including a third connector configured for connecting to a battery recharger for recharging the battery.

7. The cordless microscope as set forth in claim 4, wherein the battery is mounted within the base.

8. The cordless microscope as set forth in claim 1, wherein the circuit board is coated with a reflective material to reflect light emitted from the LEDs.

9. The cordless microscope as set forth in claim 1, wherein the light source assembly includes 4 LEDs.

10. The cordless microscope as set forth in claim 1, wherein the structure of the LEDs produces a highly-focused angle of illumination so that most of the light from the LEDs is projected upwardly toward the stage.

11. The cordless microscope as set forth in claim 10, wherein the angle of illumination of the LEDs is approximately 20 degrees.

12. A cordless microscope comprising:
   a stage for holding specimens to be viewed; and
   a light source assembly for illuminating the stage, the light source assembly including —
      a circuit board, and
      a plurality of LEDs mounted on the circuit board for projecting light toward the stage, wherein the light source assembly is removable and replaceable.

13. The cordless microscope as set forth in claim 12, wherein the light source assembly includes 4 LEDs.

14. The cordless microscope as set forth in claim 12, wherein the structure of the LEDs produces a highly-focused angle of illumination so that most of the light from the LEDs is projected upwardly toward the stage.

15. A cordless microscope comprising:
   a stand;
   a stage supported by the stand for holding specimens to be viewed;
   an objective lens supported by the stand for magnifying an image of a specimen on the stage;
   an eyepiece lens supported by the stand and coupled with the objective lens for further magnifying the image of the specimen and for permitting a user to view the image; and
   a light source assembly for illuminating the stage, the light source assembly including —
      a circuit board,
      a plurality of LEDs mounted on the circuit board for projecting light toward the stage, wherein the LEDs emit white light and provide over five thousand millicandellas of illumination, and a connector mounted on the circuit board, electrically connected with the LEDs, and configured for connecting to a battery for powering the LEDs, wherein the light source assembly is operable to provide over forty hours of continuous operation of the cordless microscope.

* * * * *